United States Patent
Cook

(10) Patent No.: US 8,412,269 B1
(45) Date of Patent: Apr. 2, 2013

(54) SYSTEMS AND METHODS FOR PROVIDING ADDITIONAL FUNCTIONALITY TO A DEVICE FOR INCREASED USABILITY

(75) Inventor: Colin N. B. Cook, Riverton, UT (US)

(73) Assignee: Celio Technology Corporation, Salt Lake City, UT (US)

( * ) Notice: Subject to any disclaimer, the term of this patent is extended or adjusted under 35 U.S.C. 154(b) by 948 days.

(21) Appl. No.: 12/055,167

(22) Filed: Mar. 25, 2008

Related U.S. Application Data

(63) Continuation-in-part of application No. 12/042,911, filed on Mar. 5, 2008, and a continuation-in-part of application No. 12/042,942, filed on Mar. 5, 2008.

(60) Provisional application No. 60/908,134, filed on Mar. 26, 2007, provisional application No. 60/908,125, filed on Mar. 26, 2007.

(51) Int. Cl.
*G06F 15/16* (2006.01)

(52) U.S. Cl. .................. 455/557; 348/14.12; 348/14.07

(58) Field of Classification Search .................. 455/419
See application file for complete search history.

(56) References Cited

U.S. PATENT DOCUMENTS

| | | | | |
|---|---|---|---|---|
| 6,622,017 B1 * | | 9/2003 | Hoffman | 455/419 |
| 6,907,264 B1 * | | 6/2005 | Sterkel | 455/556.1 |
| 6,975,612 B1 * | | 12/2005 | Razavi et al. | 370/338 |
| 7,304,665 B2 * | | 12/2007 | Takahashi | 348/207.99 |
| 7,386,304 B2 * | | 6/2008 | Alvarado et al. | 455/418 |
| 7,647,511 B2 * | | 1/2010 | Misawa | 713/300 |
| 2002/0077094 A1 * | | 6/2002 | Leppanen | 455/420 |
| 2002/0171737 A1 * | | 11/2002 | Tullis | 348/143 |
| 2003/0095125 A1 * | | 5/2003 | Lim et al. | 345/539 |
| 2003/0174138 A1 * | | 9/2003 | Shibayama | 345/545 |
| 2004/0152457 A1 * | | 8/2004 | Goldstein et al. | 455/419 |
| 2004/0214541 A1 * | | 10/2004 | Choi | 455/186.1 |
| 2006/0294247 A1 * | | 12/2006 | Hinckley et al. | 709/228 |
| 2007/0072597 A1 * | | 3/2007 | Peuziat et al. | 455/418 |
| 2007/0123302 A1 * | | 5/2007 | Kim et al. | 455/557 |
| 2008/0165714 A1 * | | 7/2008 | Dettinger et al. | 370/311 |
| 2008/0250408 A1 * | | 10/2008 | Tsui et al. | 718/100 |
| 2010/0045858 A1 * | | 2/2010 | Larsen et al. | 348/441 |
| 2010/0151918 A1 * | | 6/2010 | Annambhotla et al. | 455/573 |
| 2010/0245102 A1 * | | 9/2010 | Yokoi | 340/636.16 |
| 2011/0071780 A1 * | | 3/2011 | Tarkoma | 702/63 |
| 2011/0083025 A1 * | | 4/2011 | Lee | 713/320 |
| 2011/0320828 A1 * | | 12/2011 | Boss et al. | 713/300 |

* cited by examiner

*Primary Examiner* — Marcos Batista
*Assistant Examiner* — Frank Donado
(74) *Attorney, Agent, or Firm* — Austin Rapp & Hardman

(57) ABSTRACT

A system for providing additional functionality to a mobile device is described. The system includes a mobile enhancing device that is capable of being in electronic communication with the mobile device, the enhancing device comprising a keyboard functionality, display screen functionality, and pointing device functionality. The system may be designed such that the mobile device is a smartphone, mobile phone or a USB flash drive that includes an operating system.

8 Claims, 5 Drawing Sheets

SYSTEMS AND METHODS FOR PROVIDING ADDITIONAL FUNCTIONALITY TO A DEVICE FOR INCREASED USABILITY

CROSS-REFERENCED RELATED APPLICATIONS

This application claims the benefit of the following:
U.S. Provisional Patent Application No. 60/908,134, filed Mar. 26, 2007;
U.S. Provisional Patent Application No. 60/908,125 filed Mar. 26, 2007;
This application is also a continuation-in-part of U.S. patent application Ser. No. 12/042,911 filed Mar. 5, 2008, entitled "Method and Apparatus for Dynamically Switching Display Drivers in Mobile Device Operating System" (claiming priority to U.S. Provisional Application No. 60/908,125 filed Mar. 26, 2007); and
This application is also a continuation-in-part of U.S. patent application Ser. No. 12/042,942 filed Mar. 5, 2008 entitled "Method and Apparatus for Providing Enhanced Resolution Display for Display Telephones and PDAs." Each of these applications is expressly incorporated herein by this reference.

BACKGROUND OF THE INVENTION

Computers and electronic devices now permeate the modern world. These devices facilitate communication in all parts of the world. In fact, laptops, mobile computers, and notebook computers allow the computer to be portable and used on business trips, at airports, etc.

Mobile or cellular phone technology has also rapidly advanced in recent years. As is known in the industry, many mobile phones now include the capability of sending/receiving emails, sending/receiving text messages, sending/receiving pictures or photographs, calendaring, browsing the internet, word processing, and many other functions. Mobile telephones that include one or more of these additional functionalities (i.e., additional functionalities other than just serving as a portable telephone) are sometimes referred to as "smartphones". Many types of smartphones are simply smaller, portable computer devices. These smaller computers will include a processor as well as software/hardware that enable the smartphone to perform its desired functionality. There are a variety of different types of smartphones available on the market.

The advantage of the smartphone is that it provides the user with a small, handheld computer so that the user can send emails, perform his or her work tasks, etc. However, the keyboard associated with a smartphone is small and difficult to work with. Similarly, the display screen on the smartphone is small with low resolution. Such features of the smartphone make it difficult for a user to perform significant word processing or other significant computing tasks. Accordingly, many people do not use their smartphones for serious computing tasks, even though the device processor is technically capable of performing such functions.

Accordingly, it would be advantageous to provide a mechanism that would improve the ability of a user to perform computing functions on his/her smartphone. One form of enhancement which is known to exist provides a more functional keyboard as an externally connected device. Such devices are useful improvements for entering textual data, but do not address the other limitations of the mobile device's user interface such as small screen size, lack of pointing mechanism, etc. Other existing mechanisms for enhancing the display properties of mobile devices are described in U.S. patent application Ser. No. 12/042,942 filed Mar. 5, 2008 entitled "Method and Apparatus for Providing Enhanced Resolution Display for Display Telephones and PDAs" and is incorporated herein by this reference. Display screen enhancements may improve in varying degrees the user's visual experience, but do not address the other limitations of the mobile device such as small keyboard, etc.

What is needed is a complete system in a single embodiment which addresses all the user interface limitations of mobile devices. Such a device and system is disclosed herein.

BRIEF SUMMARY OF THE INVENTION

The system of the present invention primarily functions to provide enhanced functionality to a mobile device. A mobile enhancing device is provided for electronically communicating with applications residing on the mobile device. The enhancing device has keyboard functionality and display screen functionality. The display screen functionality displays output from the applications that reside and are executed on the mobile device. The keyboard functionality allows a user to provide inputs for the applications that reside on the mobile device. The enhancing device may also provide pointing device functionality that allows a user to provide inputs for the applications that reside on the mobile device.

The mobile device may be any of a number of mobile devices, including, but not limited to, mobile phones, smartphones, PDAs, cellular phones, media players, converged multimedia devices, wireless phones, and WIFI phones.

Where the mobile device has a keyboard, the keyboard functionality of the enhancing device provides an enhanced keyboard. For example, the keyboard may be larger and have individual keys for each letter, number, and/or symbol similar to a standard keyboard, whereas the keyboard for the mobile device may have multiple letters, numbers, or symbol for each key.

The enhancing device can permit the keyboard functionality of the enhancing device to be used in lieu of or in addition to the keyboard of the mobile device.

Where the mobile device has a display, the display screen functionality of the enhancing device provides display screen. For example, the display screen may be larger and may operate at a higher resolution. The enhancing device can also permit the display functionality to be used in lieu of or in addition to the display of the mobile device.

The mobile enhancing device may also provide a communication interface that allows the mobile device to interface with external devices that the mobile device would not otherwise have access to without the assistance of the mobile enhancing device. For example, the mobile device may not have a USB port with USB hosting capability or a VGA output for displaying an enhance display screen, but the enhancing device may provide these capabilities. Of course, there are many types of external devices that may not interface with a mobile device that can be provided by the enhancing device.

The enhancing device of the present invention can itself be mobile. It can have a shape generally like a notebook computer, a tablet computer with a keyboard, a docking station, or a tablet computer without a keyboard. As a result, the use of the mobile device can emulate the experience of working on a laptop computer by using the enhancing device. It is anticipated however that the enhancing device can be manufactured less expensively and operate with less power than a laptop or tablet computer.

The enhancing device is configured to electronically communicate with applications that reside on a mobile device such as a smartphone and the like. By connecting the enhancing device to a mobile device, a method is provided for increasing the usability of the mobile device. Heretofore, mobile devices may not have point device functionality or communication interface functionality, but by communicating with the enhancing device those functionalities are provided. Also, mobile devices may have limited or user unfriendly keyboard or display functionalities, but by communicating with the enhancing device those functionalities can be enhanced to make the user's experience much more satisfactory.

The present embodiments teach a system for providing additional functionality for increased usability to a mobile device (which is sometimes called an enhanced device). This additional functionality may be provided by an enhancing device. The enhanced device and the enhancing device may be placed in communication (e.g., electronic communication) with one another. Communication between the enhanced device and the enhancing device may occur via any communications method whether powerline, wireless and/or wired technology.

The enhancing device may communicate with the enhanced device in such a way that one or more features of the enhancing device may be made available to the enhanced device. In other words, the enhancing device may communicate with the enhanced device so that a user of the enhanced device is able to access and use at least some of the features of the enhancing device.

For example, the enhancing device may include keyboard functionality, display screen functionality, and pointing device functionality (e.g., mouse, touchpad, stylus, etc.). In this example, the mobile communication device (enhanced device) may communicate with the enhancing device so that these features of the enhancing device may be made available to the mobile communication device. Thus, when the mobile communication device is connected to the enhancing device, a user of the mobile communication device may access and use the keyboard functionality, display screen functionality, and/or pointing device functionality of the enhancing device.

At least some of the features of the enhancing device that are made available to the enhanced device may be present in the enhanced device. For example, the enhanced device (e.g., a mobile communication device) may have a small keyboard and a small display screen. However, it may not be practical to use the keyboard and display screen that are provided by the enhanced device for one or more desired tasks. The enhancing device may provide enhanced keyboard functionality (e.g., a keyboard that is enhanced over a keyboard of the mobile communication device) and enhanced display screen functionality (e.g., a display screen that is enhanced over a display screen of the mobile communication device) to the enhanced device. Thus, in this example, a user of the enhanced device may use the keyboard functionality provided by the enhancing device instead of (or possibly in addition to) the keyboard of the enhanced device. Similarly, a user of the enhanced device may use the display screen functionality provided by the enhancing device instead of (or possibly in addition to) the display screen of the enhanced device.

Where the enhancing device provides display screen functionality, the enhancing device may simply display what would otherwise be displayed on the display screen of the enhanced device without changing display resolution. Alternatively, the enhancing device may change (e.g., increase) the resolution of the video that is output by the enhanced device.

The enhancing device may include a relatively limited amount of hardware. The enhancing device may include a processor of limited capability, a video processing engine and user display, and hardware for user input. The enhancing device may also include a communications interface (e.g., a USB adapter), which may include a dedicated controller and corresponding memory. Other than these dedicated processors and the corresponding memory, the enhancing device may be configured so that it does not include any other processor or memory. For example, the enhancing device may not include a general purpose processor. The enhancing device may also be configured so that it does not include its own storage device. The enhancing device may be sufficiently small and lightweight that it may itself be a mobile device. Moreover, the enhancing device may be shaped generally like a laptop and/or tablet style computer (sometimes referred to as a notebook computer).

In other words, the enhancing device communicates with the enhanced device such that activities, functions, and capabilities of the enhanced device are accessed by the enhancing device and the user of the enhancing device can more efficiently and more effectively use the enhanced device's capabilities. For example, performing word processing tasks on the enhanced device alone can be difficult and time consuming. However, performing word processing tasks from the enhancing device is easier and more akin to using a laptop computer, but the word processing is being performed by the enhanced device. Similarly, browsing the internet form the enhanced device only has limitations and the display screen displays information in an abbreviated or truncated fashion. This makes browsing frustrating and times consuming. However, displaying the information from the enhancing device's screen (at a higher resolution) makes browsing more effective and more satisfying.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
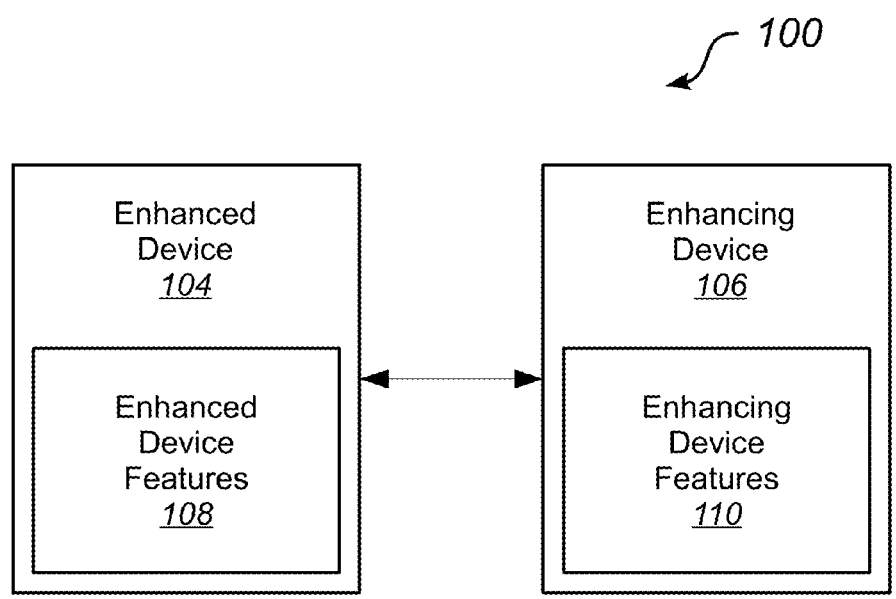
FIG. 1 is a block diagram illustrating a system for providing additional functionality to a device for increased usability.

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the present invention, as represented in the Figures, is not intended to limit the scope of the invention, as claimed, but is merely representative of presently preferred embodiments of the invention.

Several exemplary embodiments are now described with reference to the Figures. This detailed description of several exemplary embodiments, as illustrated in the Figures, is not intended to limit the scope of the claims.

The word "exemplary" is used exclusively herein to mean "serving as an example, instance or illustration." Any embodiment described as "exemplary" is not necessarily to be construed as preferred or advantageous over other embodiments.

As used herein, the terms "an embodiment," "embodiment," "embodiments," "the embodiment," "the embodiments," "one or more embodiments," "some embodiments," "certain embodiments," "one embodiment," "another embodiment" and the like mean "one or more (but not necessarily all) embodiments," unless expressly specified otherwise.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the embodiments disclosed herein may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the embodiment that is being described, the order and/or use of specific steps and/or actions may be modified without departing from the scope of the claims.

FIG. 1 is a block diagram illustrating a system 100 for providing additional functionality to a mobile device for increased usability. This mobile device is referred to as the "enhanced device" and may be, for example, a smartphone. An enhancing device 106 is also shown in FIG. 1. The enhanced device 104 and the enhancing device 106 may be located in relatively close proximity to one another. In other words, the enhanced device 104 and the enhancing device 106 may be positioned so that they are not remote from each other.

The enhanced device 104 and the enhancing device 106 are shown in communication (e.g., electronic communication) with one another. Communication between the enhanced device 104 and the enhancing device 106 may occur via any communications method whether powerline, wireless and/or wired technology.

The enhancing device 106 is shown with one or more enhancing features 110. The enhancing device 106 may communicate with the enhanced device 104 in such a way that one or more features 110 of the enhancing device 106 may be made available to the enhanced device 104. In other words, the enhancing device 106 may communicate with the enhanced device 104 so that a user of the enhanced device 104 is able to access and use at least some of the features 110 of the enhancing device 106. By providing these features 110, the enhancing device 106 is able to give the user of the enhanced device 104 a new (and possibly better) experience than would be possible without the enhancing device 106.

For example, the enhanced device 104 may be a mobile communication device, such as a mobile phone or a smartphone. The enhancing device 106 may include the following features 110: keyboard functionality, display screen functionality, pointing device functionality (e.g., mouse, touchpad, stylus, etc.), and removable storage functionality (e.g. USB connected flash memory, etc.). In this example, the mobile communication device may communicate with the enhancing device 106 so that these features 110 of the enhancing device 106 may be made available to the mobile communication device. Thus, when the mobile communication device is connected to the enhancing device 106, a user of the mobile communication device may access and use the keyboard functionality, display screen functionality, and/or pointing device functionality of the enhancing device 106.

At least some of the features 110 of the enhancing device 106 that are made available to the enhanced device 104 may be present in some form in the enhanced device 104. For example, the enhanced device 104 (e.g., a mobile communication device) may have a small keyboard and a small display screen. However, it may not be practical or convenient to use the small keyboard and small display screen that are provided by the enhanced device 104 for one or more desired tasks. The enhancing device 106 may provide enhanced keyboard functionality (e.g., a keyboard that is enhanced over a keyboard of the mobile communication device) and enhanced display screen functionality (e.g., a display screen that is enhanced over a display screen of the mobile communication device) to the enhanced device 104. Thus, in this example, a user of the enhanced device 104 may use the keyboard functionality provided by the enhancing device 106 instead of (or possibly in addition to) the keyboard of the enhanced device 104. Similarly, a user of the enhanced device 104 may use the display screen functionality provided by the enhancing device 106 instead of (or possibly in addition to) the display screen of the enhanced device 104.

At least some of the features 110 of the enhancing device 106 that are made available to the enhanced device 104 may not be present at all in the enhanced device 104. For example, the enhanced device 104 (e.g., a mobile communication device) may not have any type of pointing device (e.g., mouse, touchpad, stylus, etc.) functionality. The enhancing device 106 may provide pointing device functionality to the enhanced device 104. Thus, in this example, a user of the enhanced device 104 may be able to benefit from pointing device functionality, even though the enhanced device 104 itself does not include pointing device functionality.

Where the enhancing device 106 provides display screen functionality, the enhancing device 106 may simply display what would otherwise be displayed on the display screen of the enhanced device 104 (e.g., without changing resolution). Alternatively, the enhancing device 106 may change (e.g., increase) the resolution of the video that is output by the enhanced device 104. Thus, in addition to providing a larger display screen, the display screen resolution on the enhancing device 106 may be greater than the display screen resolution on the enhanced device 104.

The enhancing device 106 may provide enhanced display screen functionality even if the display screens of both the enhancing device 106 and the enhanced device 104 have the same physical size. For example, the enhancing device 106 may be capable of displaying images on its display screen at a higher resolution than the enhanced device 104 is capable of displaying images on its display screen. Thus, in this example, increased display screen resolution is itself a feature 110 that the enhancing device 106 may provide to the enhanced device 104.

Where the enhancing device 106 provides keyboard functionality, the enhancing device 106 may include a physical keyboard, and the improved keyboard functionality provided by the enhancing device 106 may be provided via the physical keyboard. Alternatively, the enhancing device 106 may include a software based keyboard (sometimes referred to as a virtual keyboard) instead of (or possibly in addition to) the physical keyboard, and the keyboard functionality may be provided via the software based keyboard. Embodiments may be made in which the enhanced device 104 (the mobile device) includes a keyboard (or keyboard functionality). However, such keyboards (whether physical or electronic) on the mobile device may be small and difficult to use for many applications. Accordingly, the keyboard on the enhancing device 106 (whether physical or electronic) may be larger and easier to use than the keyboard on the enhanced device 104. By using the larger, easier-to-use keyboard on the enhancing device 106, the user's experience and/or satisfaction may be improved.

There are many different kinds of devices 104 that may be enhanced as described above. Some examples include smartphones, mobile phones, cellular phones, feature phones, state machines, watches, notebook computers, MP3 players (e.g., iPods® and iPhones™), tablet PCs, PDAs, keyless entry controllers, remote automobile starters, cordless telephones, etc.

Under some circumstances, the enhancing device 106 may provide one or more features 110 to a device 104 that does not include any keyboard functionality, display screen functionality, or pointing device functionality. An example of this type of enhanced device 104 is a USB flash drive (sometimes referred to as a thumb drive) that provides a form of removable storage. A USB flash drive does not include its own keyboard functionality, display screen functionality, or pointing device functionality. However, this type of device may be connected to the enhancing device 106 and provided as one of the enhancing features 110 of the enhancing device 106 so that a user of the enhanced device 104 may have access to this form of removable storage through the operation of the enhancing device 106.

The features 110 that are provided by the enhancing device 106 may be related to some inherent characteristic of the enhanced device 104 which limits the functionality of the enhancing device 106. In some of the examples discussed above, the enhanced device 104 was a mobile communication device. A mobile communication device is typically relatively small (thereby making it mobile). This characteristic serves as a limitation on some of the functionality that can be provided by the mobile communication device, such as the size of its display screen, the size or design of a keyboard that it may include, etc. The enhancing device 106 may provide the functionality that the mobile communication device is unable to provide because of its inherent size or design limitation.

An enhancing device 106 may simply provide display functionality without keyboard functionality or pointing device functionality. The display functionality may be used simply to display messages or other content that originates with the enhanced device 104.

There are many examples of features 110 that may be provided by an enhancing device 106 to an enhanced device 104. The examples discussed above have included enhanced keyboard functionality, enhanced display screen functionality, and enhanced pointing device functionality. However, the enhancing device 106 is not limited to providing keyboard/display/pointing device functionality.

For example, an enhancing device 106 may be thought of as providing some type of interface or communication to the enhanced device 104 that allows the user to connect to the enhanced device 104. For example, as indicated above, the enhanced device 104 may be a USB flash drive that provides a form of removable storage. The enhancing device 106 may be thought of as providing an interface (in some circumstances, an additional interface) to the enhanced device 104 which allows a user to access one or more features 108 of the enhanced device 104 (e.g., the removable storage provided by the USB flash drive).

Another example of a feature 110 that may be provided by the enhancing device 106 is one or more communication interfaces. In other words, the enhancing device 106 may include a communication interface that the enhanced device 104 does not include. Another device may then connect to the enhanced device 104 via this communication interface on the enhancing device 106.

To take a specific example, suppose that the enhanced device 104 is a smartphone. Many smartphones do not have a USB port. The enhancing device 106 may include a USB or other port. In this example, when the enhancing device 106 communicates with the enhanced device 104 (smartphone), the enhanced device 104 may then access a variety of peripheral devices (e.g., printers, keyboards, mouse, and/or other peripherals) via this USB port. In other words, a variety of USB devices that otherwise could not be connected to the enhanced device 104 are able to connect to the enhanced device 104 because of the USB port that is provided by the enhancing device 106. In this way, the USB port itself can be thought of as a feature (or added functionality) that is provided by the enhancing device 106 to the enhanced device 104.

Many different types of communication interfaces may be provided by the enhancing device 106. The enhancing device 106 is not limited to any specific type of communication interface. The communication interface(s) provided by the enhancing device 106 may facilitate any communication methods and may include powerline, wired or wireless communication between the enhanced device 104 and one or more other devices.

The enhancing device 106 may include a relatively limited amount of hardware. The enhancing device 106 may include a video processor (also referred to as a graphics accelerator, display adapter, graphics card, etc.) which may include a dedicated graphics microprocessor and corresponding memory. The enhancing device 106 may also include a communications port adapter (e.g., a USB adapter), which may include a dedicated controller and corresponding memory. Other than these dedicated processors and the corresponding memory, the enhancing device 106 may be configured so that it does not include any other processor or memory. For example, the enhancing device 106 may not include a general purpose processor. The enhancing device 106 may also be configured so that it does not include its own storage device.

The enhancing device 106 may be sufficiently small and lightweight that it may itself be a mobile device. Moreover, the enhancing device 106 may be shaped generally like a laptop and/or tablet style computer (sometimes referred to as a notebook computer). Thus, when the enhancing device 106 is in communication with a mobile computing device, the user may have an experience that is similar to using a laptop or tablet style computer. However, because the enhancing device 106 may be configured without its own general purpose processor, memory, or storage device, the enhancing device 106 may be manufactured less expensively than (at least some) laptop computers.

Figure 2:
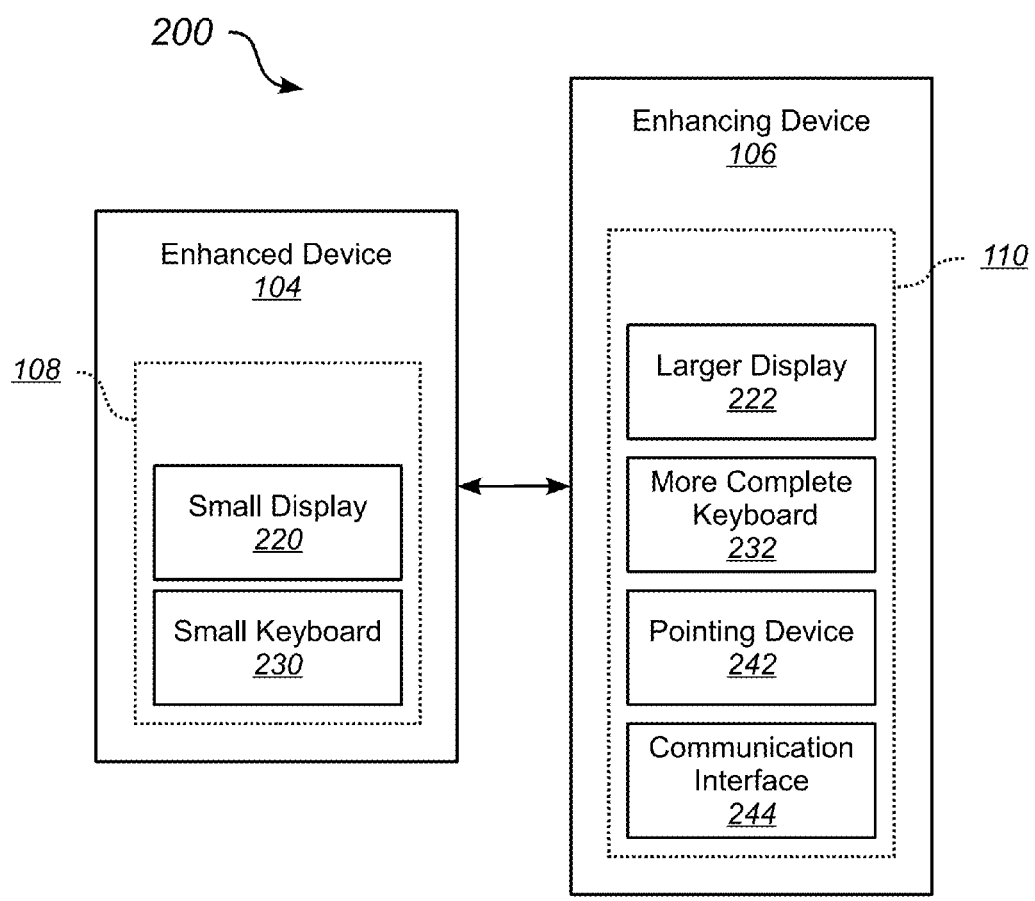
FIG. 2 is a block diagram illustrating a specific embodiment of a system for providing additional functionality to a device for increased usability.

FIG. 2 is a block diagram illustrating a specific example of a system 200 for providing additional functionality to a device for increased usability. Although the system 200 shown in FIG. 2 is an example of a specific implementation of the system 100 shown in FIG. 1, the present disclosure is not limited to the specific example that is shown in FIG. 2.

An enhanced device 104 and an enhancing device 106 are shown. The enhanced device 104 and the enhancing device 106 are shown in communication (e.g., electronic communication) with one another.

The enhanced device 104 is shown with one or more features 108. These features 108 may include a small display 220, a limited keyboard 230, and/or other features 108. The enhancing device 106 is shown with one or more features 110. These features 110 may include a larger display 222, a more complete keyboard 232, a pointing device 242, a communication interface 244, and/or other features 110.

Some of the features 108 on the enhanced device 104 may be limited in comparison to the features 110 on the enhancing device 106. For example, the enhanced device 104 may include a smaller display 220 in comparison to the larger display 222 on the enhancing device 106. In another example, the enhanced device 104 may include a limited keyboard 230 (e.g., a keypad) in comparison to the more complete keyboard 232 on the enhancing device 106. The enhancing device 106 may provide these features 110 (i.e., the larger display 222 and/or the more complete keyboard 232) instead of (or possibly in addition to) the features 108 on the enhanced device 104.

Some of the features 110 on the enhancing device 106 may not be present on the enhanced device 104. For example, the enhancing device 106 may include a pointing device 242 that may not be included with the enhanced device 104.

The enhancing device 106 may include a communication interface 244 that is not included in the enhanced device 104. Another device may then connect to the enhanced device 104 via this communication interface 244 on the enhancing device 106.

The enhanced device 104 may be a mobile communication device 104. Where the enhanced device 104 is a mobile communication device 104, it is contemplated that the mobile communication device 104 will communicate with the enhancing device 106 in order to offer the user an enhanced usability experience. For example, instead of viewing documents on the small display 220 of the mobile communication device 104, the user may view documents on the larger display 222 of the enhancing device 106. The documents may be displayed at a higher resolution on the larger display 222 of the enhancing device than they could be displayed on the small display 220 of the mobile communication device 104. In addition, the user may also use the more complete keyboard 232 of the enhancing device 106 instead of the limited keyboard 230 provided by the enhanced device 104. The user may also use the pointing device 242 of the enhancing device 242 (in this example the enhanced device 104 does not include a pointing device). The user may also configure the enhanced device 104 for communication with other types of devices via the communication interface 244 (e.g., via a USB port, via a wireless adapter, etc.) of the enhancing device 106.

Figure 3:
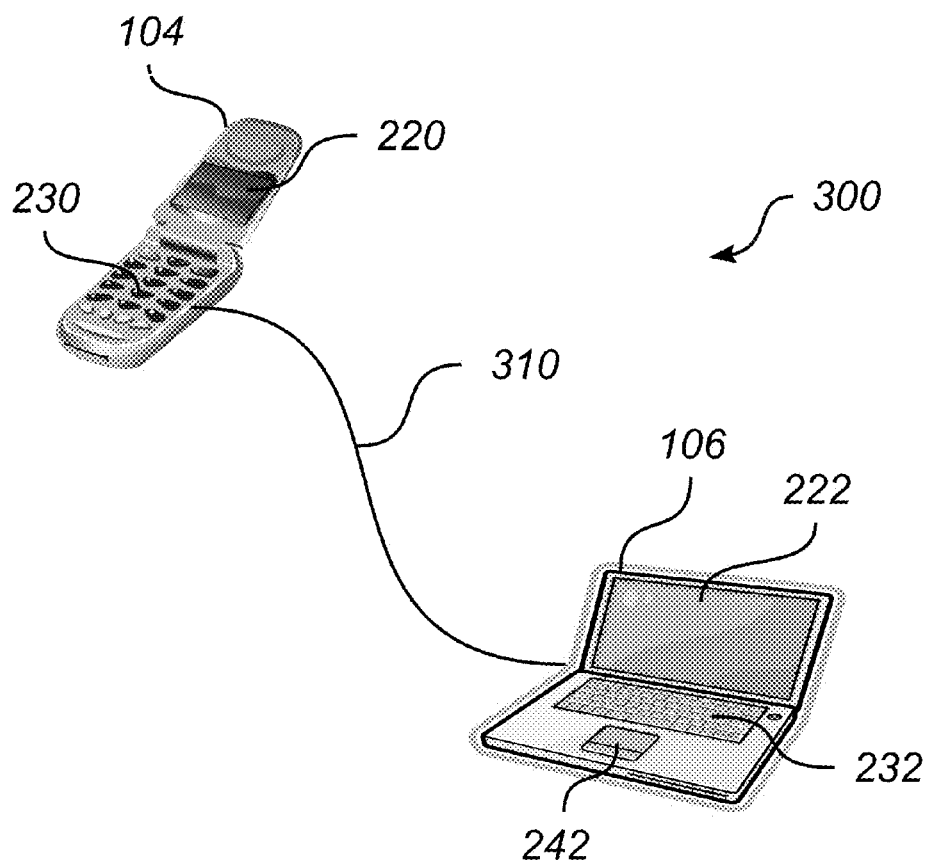
FIG. 3 is a perspective view of a system for providing additional functionality to a mobile device.

FIG. 3 is a perspective view of a system 300 for providing additional functionality to a mobile device 104. As with the previous embodiments, the system 300 includes a mobile enhancing device 106 that is in electronic communication with the mobile device 104. As shown in FIG. 3, a wired communication technology 310 is used to allow the mobile device to be in electronic communication with the enhancing device 106. However, other types of communication protocols, including wireless (e.g. radio, infrared, optical, etc.) and powerline technologies, may also be used.

In FIG. 3, the mobile device 104 is shown as a smartphone. However, as explained above, in other embodiments, the mobile device 104 may be a mobile phone, a cellular phone, a feature phone, a state machine, a watch, a notebook computer, MP3 player, tablet PC, PDA, keyless entry controller, remote automobile starter, cordless telephone, etc.

The mobile device 104 includes a keyboard 230 and a display screen 220. The display screen 220 is generally small. Similarly, the keyboard 230 may be small or have limited buttons/letters. In other embodiments, the keyboard 230 will be electronic (or virtual) on the display screen 220. The small keyboard 230 and display screen 220 can often mean that performing computing tasks on the mobile device 104 is uncomfortable.

The enhancing device 106 may be sufficiently small and lightweight that it may itself be a mobile device. In the embodiment of FIG. 3, the enhancing device 106 is shaped generally like a laptop and/or tablet style computer. Thus, when the enhancing device 106 is in communication with a mobile computing device, the user may have an experience that is similar to using a laptop or tablet style computer. However, because the enhancing device 106 may be configured without its own general purpose processor, memory, or storage device, the enhancing device 106 may be manufactured less expensively than (at least some) laptop computers.

The enhancing device 106 may include a keyboard functionality 232 and a display functionality 222. The keyboard functionality 232 may be a physical or virtual keyboard. Similarly, the display functionality 222 may be a monitor or display screen. Clearly the keyboard functionality 232 is larger than the keyboard 230 of the mobile device 104. Likewise, the display functionality 222 is larger than the display 220 of the mobile device 104. Similarly, the display functionality 222 may be configured to display the content at a higher resolution/clarity that that which his possible on the display 220 of the mobile device 104. Thus, there may be advantages to using the enhancing device 106 rather than the enhanced device 104.

The enhancing device 106 may also include pointing device functionality 242. This pointing device functionality 242 may be a touchpad, as illustrated in FIG. 3. Other embodiments may be designed in which the pointing device functionality 242 comprises a mouse, trackpad, stylus, etc. As is known, some mobile devices 104 may not include a mouse or other type of pointing device functionality. Accordingly, by using the enhancing device 106, the popular functionality of a mouse, trackpad, etc. is now available to the user of the mobile device 104.

Figure 4:
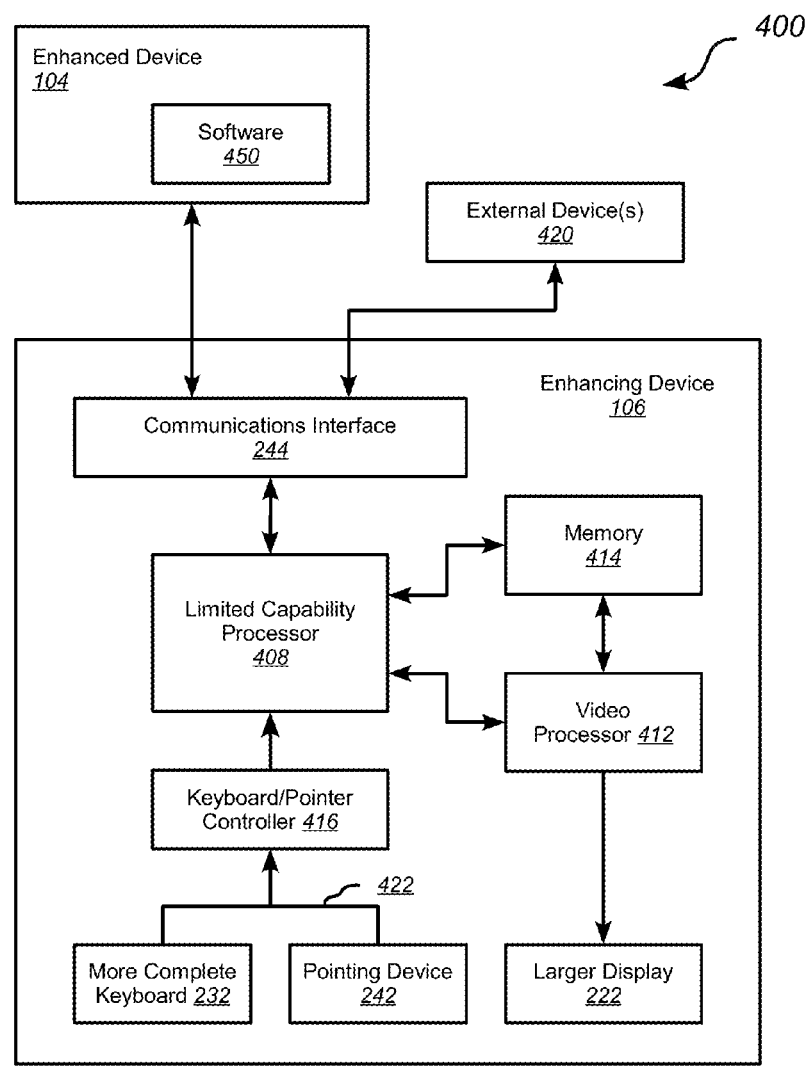
FIG. 4 is a block diagram that illustrates another exemplary embodiment of a mobile enhancing device that may be used to provide additional functionality to an enhanced (mobile) device.

FIG. 4 is a block diagram that illustrates the components of an exemplary embodiment 400 of a mobile enhancing device 106. This mobile enhancing device 106 may be used to provide additional functionality to an enhanced (mobile) device 104.

The enhancing device 106 may include a relatively limited amount of hardware. In general, the components of the enhancing device 106 may have limited and/or specialized capabilities when compared with corresponding general purpose computing components. The hardware components of the enhancing device 106 may be of a custom design and may be of a type that can be implemented with configurable and/or application specific technologies such as Field Programmable Gate Arrays (FPGA's), Application Specific Integrated Circuits (ASIC's), etc. Such implementations may provide certain advantages such as reduced cost and power requirements. Alternatively, the components of the enhancing device 106 may be of a standard type and, in fact, may be of a type which is commercially available. Alternatively, the components of the enhancing device 106 may be a mixture of custom designed and standard types. With this understanding, the components of the enhancing device 106 will be discussed without further reference to their specific implementation technologies.

The enhancing device 106 may include a processor of limited capability 408. The limited capability processor 408 executes instructions, programs, and software sufficient to enable the proper operation of the other components of the enhancing device 106. The instructions, programs, and software executed by the limited capability processor 408 may be hard coded within the design of the limited capability processor 408 or stored within an associated memory component 414 (described hereafter). The description of FIG. 4 illustrates a particular embodiment and is not intended to exclude other possible embodiments which may use other methods of storing instructions, programs, and software such as flash memory, read-only-memory, etc.

The enhancing device 106 may also include a video processor 412 as illustrated in the embodiment of FIG. 4. (The video processor 412 may also be referred to as a graphics accelerator, display adapter, graphics card, etc.). As noted, the video processor 412 may be of a custom design and implemented in combination with other hardware features of the enhancing device 106 with the benefit of reduced cost and power requirements. The use of the video processor 412 allows the enhancing device 106 to provide the display screen functionality 222. In other words, the video processor 412 creates the images for the display 222 that is readable and usable by the user.

While not shown in the embodiment of FIG. 4, the video processor 412 may also provide support for external video display equipment such as (but not limited to) monitors, digital displays, projectors, etc. using, for example, standard display electrical and data interfaces such as VGA, NTSC, PAL, etc. or non-standard, special purpose interfaces such as (but not limited to) those used for Liquid Crystal Displays (LCD's), plasma displays, and other types of displays and indicators.

As described in this embodiment, the video processor 412 may use a memory component 414 for its operation. For example, the video process 412 may use a memory component 414 for one or more video frame buffers. This description is not intended, however, to exclude other possible embodiments that may use memory components internal to the video processor, or specialized implementations which will be understood by one skilled in the art.

The embodiment of FIG. 4 further illustrates a keyboard and pointer device controller component 416. The purpose of the keyboard and pointer device controller component 416 is to efficiently localize control of input devices with features that may enhance the usability of the attached enhanced device (e.g. mobile phone) 104. FIG. 4 describes two input devices, a more complete keyboard 232 and a pointing device 242, however it is not the intention of this illustration to limit the type and number of input devices to be those shown here. Some embodiments, for example, may include video capture devices, fingerprint or other biometric sensors, GPS devices, environmental sensors (temperature, pressure, etc), and other input devices intended to enhance the experience of the enhanced device 104 user.

The enhancing device 106 may also include a communications interface 244. In some embodiments, this interface 244 may be a USB adapter. The interface 244 may include a dedicated controller and some memory. This communications interface 244 may be of the type commercially available and may be standard in the industry. The purpose of the communications interface 244 is to allow the enhancing device 106 to communicate with one or more external devices 420. This external device(s) 420 may be, for example, printers, keyboards, mouse, and/or other external devices that communicate via the interface electrical and data protocols. It should be noted that a variety of USB devices, for example, that otherwise could not be connected to the enhanced device 104 are able to connect to the enhanced device 104 because of the communications interface 244 (e.g., USB port) that is provided by the enhancing device 106. In this way, the USB port itself can be thought of as a feature (or added functionality) that is provided by the enhancing device 106 to the enhanced device 104.

Further, the communications interface 244 illustrated in FIG. 4 is to be considered as representing all connections between the enhancing device 106 and externally connected devices 420 as well as the enhanced device 104. This should not be taken to imply that all connections between the enhancing device 106 and externally connected devices are required to use the same connection mechanisms, e.g. USB, BlueTooth, etc. The invention anticipates that the enhancing device 106 may be capable of supporting a variety of connection mechanisms simultaneously. For example, a connection to the enhanced device 104 may be maintained using a BlueTooth wireless mechanism at the same time that a mouse connection using USB is being maintained.

Other than these dedicated processors and controllers 408, 412, 416, 244 and the corresponding memory 414 associated with the video processor 412 and the memory that may be associated with the communications interface 244, the enhancing device 106 may be configured so that it does not include any other processor or memory. For example, the enhancing device 106 may not include a general purpose processor. The enhancing device 106 may also be configured so that it does not include its own storage device. The omission of a storage device (memory) or general purpose processor from the enhancing device 106 means that this device may be manufactured more inexpensively than some currently known laptop computers.

The enhanced device 104 is capable or receiving inputs 422. In general, such inputs 422 will be key strokes (from a person clicking the buttons on the keyboard 232), mouse "clicks", inputs from the touchpad, stylus, 242 etc. The way in which these inputs 422 will be handled is described herein.

As can be seen in FIG. 4, the enhanced device 104 (i.e., the mobile device) includes software 450. The software 450 is a program that allows the enhanced device 104 to communicate with and access/use the functionality of the enhancing device 106. When the enhancing device 106 is in electronic communication with the enhanced device 104, the user may use the functionality of the enhancing device 106 instead of (or in addition to) the functionality found on the enhanced device 104 (such as the keyboard functionality 232, the display functionality 222, the mouse/point functionality 242, the USB or communications functionality 244, 420). The software 450 is designed to allow this to occur. For example, the software 450 is designed such that it will recognize the keystrokes or mouseclicks entered on the enhancing device 106. Such inputs are recognized by the software 450 and may be used to perform computing tasks on the enhanced device 104. Thus, the user may type email, perform word processing, etc. using the inputs found on the enhancing device 106, thereby improving the user's computing experience. Other embodiments of the software 450 may allow the enhanced device 104 to communicate with (including receiving inputs and sending output) the external devices 420 via the communications interface 244.

As explained above in greater detail, embodiments of the software 450 may be designed in which the display screen of the enhancing device 106 may be used in addition to the visual display on the enhanced device 104. This may involve having the display of the enhancing device 106 display the same content/output as the display on the enhanced device 104. Those skilled in the art would appreciate a variety of different ways that this may be accomplished/implemented. In some embodiments, this may involve using one or more video drivers and switching between such drivers. One way in which this may be accomplished is described in U.S. patent application Ser. No. 12/042,911 filed Mar. 5, 2008, entitled "Method and Apparatus for Dynamically Switching Display Drivers in Mobile Device Operating System" which claims priority to U.S. Provisional Patent Application No. 60/908,125 filed Mar. 26, 2007. This patent application and provisional patent application are is expressly incorporated herein by this reference).

Figure 5:
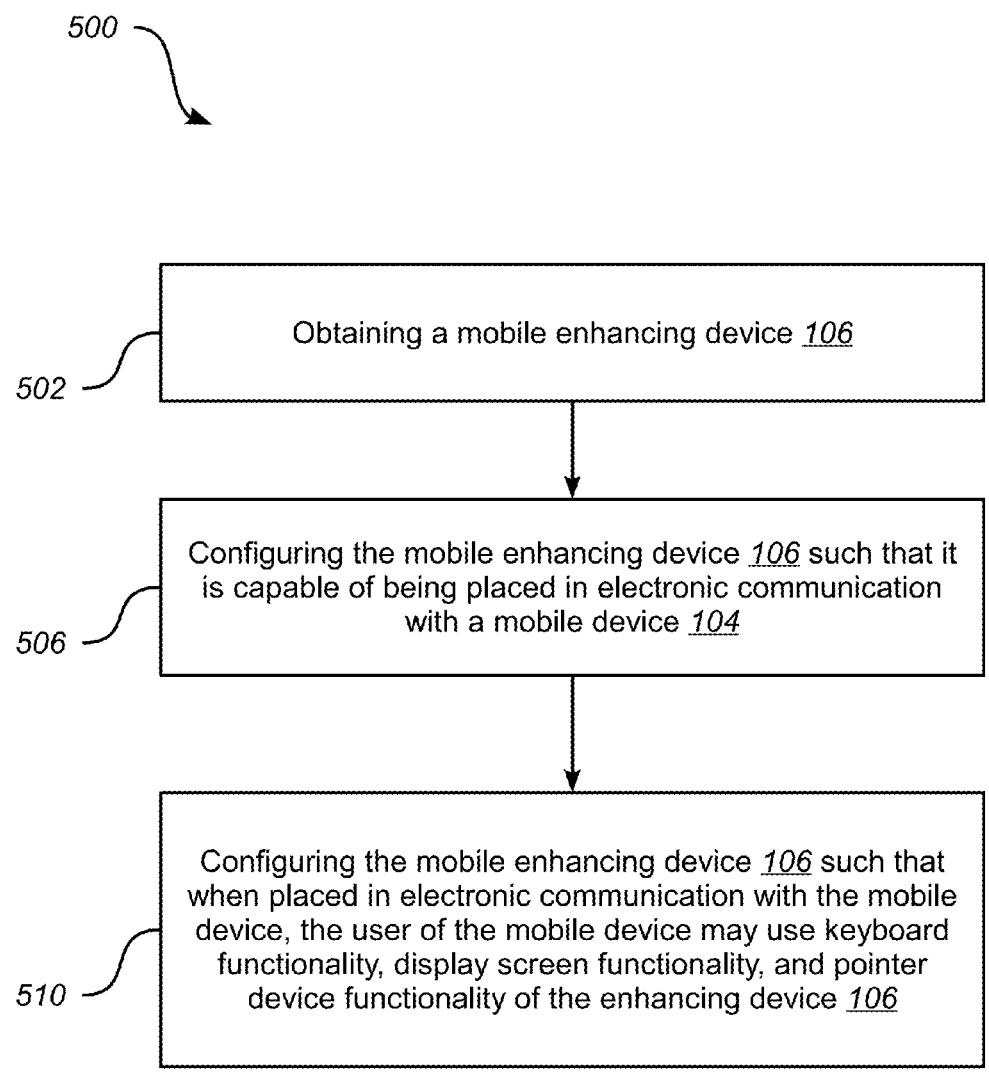
FIG. 5 is a flow chart that illustrates one embodiment of a method according to the present embodiments.

FIG. 5 is a flow chart that shows a method 500 for providing additional functionality to a mobile device 104. The mobile device 104 may be of the type described above. The method 500 comprises the step of obtaining 502 a mobile enhancing device 106 comprising a keyboard functionality, a display screen functionality, and a pointer device functionality. The mobile enhancing device 106 is of the type described herein. The method 500 also includes the step of configuring 506 the mobile enhancing device 106 such that it is capable of being placed in electronic communication with a mobile device 104.

Further embodiments may be designed in which the method 500 also includes the step of configuring 510 the enhancing device 106 such that when the mobile enhancing device 106 is placed in electronic communication with the mobile device 104, a user of the mobile device 104 may use the keyboard functionality, a display screen functionality, and a pointer device functionality of the enhancing device. In other embodiments, the method may further be designed such that the mobile enhancing device 106 further comprises a communication interface, wherein the enhancing device 106 is configured such that when the mobile enhancing device 106 is placed in electronic communication with the mobile device 104, a user of the mobile device 104 may use the communication interface of the enhancing device 106.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. An enhancing device for providing enhanced functionality to a smart phone, the enhancing device comprising:
   a display screen;
   a communication interface for communication with the smart phone; and
   at least one user operable input device selected from a keyboard, a touchpad and a mouse;
   wherein, when the enhancing device is in communication with the smart phone, the enhancing device is capable of displaying on the display screen, output generated by the smart phone at a higher resolution than the smart phone, the enhancing device comprising a first display buffer and a second display buffer, the smart phone comprising a third display buffer and a fourth display buffer, the first display buffer being configured to be synchronized with the third display buffer of the smart phone, wherein if source image data is in the fourth display buffer of the smart phone, the enhancing device is configured to determine whether the source image data is in the second buffer of the enhancing device, and if the source image data is in the second buffer, the enhancing device is configured to copy the source image data from the second buffer to the first buffer of the enhancing device rather than receiving the source image data from the smart phone.

2. The enhancing device of claim 1, wherein the display screen of the enhancing device is larger than a screen of the smart phone.

3. The enhancing device of claim 1, wherein the enhancing device comprises a first set of types of communication interfaces and the smart phone includes a second set of types of communication interfaces, wherein the first set includes at least one type of communication interface not included in the second set.

4. The enhancing device of claim 1, wherein the enhancing device is capable of displaying documents stored on the smart phone.

5. The enhancing device of claim 1, wherein the enhancing device is capable of displaying visual representations of applications residing on the smart phone.

6. The enhancing device of claim 1, wherein the enhancing device comprises the keyboard, the keyboard being more complete than a keyboard of the smart phone.

7. The enhancing device of claim 1, further comprising the smart phone.

8. The smart phone of claim 7, wherein, when the enhancing device is in communication with the smart phone, software on the smart phone is capable of receiving and processing signals generated in response to input to the at least one user operable input device of the enhancing device.

* * * * *